(12) United States Patent
Griess et al.

(10) Patent No.: US 7,333,898 B2
(45) Date of Patent: Feb. 19, 2008

(54) PASSIVE STRUCTURAL ASSESSMENT AND MONITORING SYSTEM AND ASSOCIATED METHOD

(75) Inventors: Kenneth H. Griess, Kent, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/422,223

(22) Filed: Jun. 5, 2006

(65) Prior Publication Data

US 2007/0282541 A1 Dec. 6, 2007

(51) Int. Cl.
*G06F 19/00* (2006.01)
(52) U.S. Cl. .......................................... 702/35; 714/25
(58) Field of Classification Search ................ 702/35, 702/182–185, 188; 714/25
See application file for complete search history.

(56) References Cited

U.S. PATENT DOCUMENTS

| | | | |
|---|---|---|---|
| 6,006,163 A | 12/1999 | Lichtenwalner et al. | |
| 6,386,038 B1 | 5/2002 | Lewis, III et al. | |
| 6,617,963 B1 * | 9/2003 | Watters et al. | 340/10.41 |
| 6,915,217 B2 | 7/2005 | Springer, III et al. | |
| 2006/0004499 A1 | 1/2006 | Trego et al. | |
| 2006/0069520 A1 | 3/2006 | Gorinevsky et al. | |

* cited by examiner

*Primary Examiner*—Edward Raymond
(74) *Attorney, Agent, or Firm*—Alston & Bird LLP (57) ABSTRACT

A system and method for assessing and monitoring a structure are provided. The system includes at least one non-destructive inspection sensor carried by the structure and configured for acquiring data in response to ambient events associated with the structure. The system also includes a data acquisition system configured to communicate with the non-destructive inspection sensor and provide information indicative of a defect in the structure based on the data acquired by the non-destructive inspection sensor in response to the ambient events.

24 Claims, 4 Drawing Sheets

PASSIVE STRUCTURAL ASSESSMENT AND MONITORING SYSTEM AND ASSOCIATED METHOD

BACKGROUND OF THE INVENTION

1) Field of the Invention

Embodiments of the present invention relate to a structural assessment and monitoring system and, more particularly, to a passive structural assessment and monitoring system for inspecting a structure.

2) Description of Related Art

Non-destructive inspection (NDI) of structures involves thoroughly examining a structure without harming the structure or requiring its significant disassembly. Non-destructive inspection is typically preferred to avoid the schedule, labor, and costs associated with removal of a part for inspection, as well as avoidance of the potential for inducing damage into the structure. Non-destructive inspection is advantageous for many applications in which a thorough inspection of the exterior and/or interior of a structure is required. For example, non-destructive inspection is commonly used in the aircraft industry to inspect aircraft structures for any type of internal or external damage to or defects (flaws) in the structure. Inspection may be performed during manufacturing or after the completed structure has been put into service, including field testing, to validate the integrity and fitness of the structure. In the field, access to interior surfaces of the structure is often restricted, requiring disassembly of the structure, introducing additional flow time and labor costs.

Among the structures that are routinely non-destructively tested are composite structures, such as composite sandwich structures and other adhesive bonded panels and assemblies and structures with contoured surfaces. These composite structures, and a shift toward lightweight composite and bonded materials such as using graphite materials, dictate that devices and processes are available to ensure structural integrity, production quality, and life-cycle support for safe and reliable use. As such, it is frequently desirable to inspect structures to identify any defects, such as cracks, discontinuities, voids, or porosity, which could adversely affect the performance of the structure. For example, typical defects in composite sandwich structures, generally made of one or more layers of lightweight honeycomb or foam core material with composite or metal skins bonded to each side of the core, include disbonds which occur at the interfaces between the core and the skin or between the core and a buried septum.

Various types of sensors may be used to perform non-destructive inspection. One or more sensors may move over the portion of the structure to be examined, and receive data regarding the structure. For example, a pulse-echo (PE), through transmission (TT), or shear wave sensor may be used to obtain ultrasonic data, such as for thickness gauging, detection of laminar defects and porosity, and/or crack detection in the structure. Resonance, pulse-echo, or mechanical impedance sensors are typically used to provide indications of voids or porosity, such as in adhesive bondlines of the structure.

High resolution inspection of aircraft structure is commonly performed using ultrasonic testing (UT) to provide a plan view image of the part or structure under inspection. Data acquired by sensors is typically processed and then presented to a user via a display as an image of the inspected structure. To increase the rate at which the inspection of a structure is conducted, a scanning system may include arrays of inspection sensors, i.e., arrays of transmitters and/or detectors. Non-destructive inspection may be performed manually by technicians who typically move an appropriate sensor over the structure, by semi-automated inspection systems (e.g., the Mobile Automated Scanner (MAUS®) system), and by automated inspection systems (e.g., Automated Ultrasonic Scanning System (AUSS®) system) that have also been developed.

New aircraft structures comprised of composites, multi-functional systems, and complex geometries create a maintenance burden for aircraft inspection. The maintenance tools, procedures, and practices used on metallic aircraft are generally not compatible or cost effective with next generation aircraft structures. New aircraft structures will most likely be a mix of bonded and bolted laminates with a variety of metallic and composite substructures. Removing panels to gain access to structural components will be more difficult with these new integrated structural systems.

Since composite materials can often hide a defect, a detection system is needed to promote user confidence and to reduce the impact of additional undetected damage growth. The ability to detect flaws, monitor anomalies, or predict damage is dependant on the system and sensors used by inspectors. Using existing NDI equipment and processes presents a solution that is costly and time-consuming. In particular, for in-service inspection, NDI sensors are generally placed by hand onto the structure under inspection by an inspector, who is unable to easily access all locations that require inspection. Inspection of some areas of an aircraft can be time-consuming and costly because of their locations.

It would therefore be advantageous to provide a system that is capable of monitoring and assessing a structure. In addition, it would be advantageous to provide a system that is capable of inspecting structures effectively and efficiently. Furthermore, it would be advantageous to provide a system that is economical to manufacture and use.

BRIEF SUMMARY OF THE INVENTION

Embodiments of the invention address the above needs and achieve other advantages by providing a structural assessment and monitoring system that is capable of monitoring non-destructive inspection (NDI) sensors to provide information indicative of a defect in the structure, as well as other information indicative of the structure. In particular, for in-service inspection, NDI sensors are integrated with the structure, such as an aircraft, such that the NDI sensors may acquire data and transfer data to a data acquisition system in response to ambient events associated with the structure. Thus, data may be acquired from various locations on a structure that would typically be difficult or time consuming to access with conventional inspection techniques to assess the structural integrity of the structure.

In one embodiment of the present invention, a system for assessing and monitoring a structure is provided. The system includes at least one non-destructive inspection sensor (e.g., a piezoelectric sensor) carried by the structure and configured for acquiring data in response to ambient events associated with the structure. The system also includes a data acquisition system capable of communicating with the non-destructive inspection sensor and providing information indicative of a defect in the structure based on the data acquired by the non-destructive inspection sensor in response to the ambient events.

In various aspects of the system, the non-destructive inspection sensor is capable of wirelessly transmitting the acquired data. The non-destructive sensor may be attached to, or embedded within, the structure, and could alternatively be carried by an appliqué or a repair patch. The non-destructive inspection sensor can store the acquired data, such as with a memory device. The system could further include one or more signal generation devices for generating one or more respective events within the structure. The non-destructive inspection sensor could acquire data indicative of the event generated by each signal generation device, and the signal generation device may be attached to, or embedded within, the structure. Furthermore, the data acquisition system could utilize a neural network for analyzing the acquired data.

A further aspect of the present invention provides a method for assessing and monitoring a structure. The method includes acquiring data indicative of the structure with at least one non-destructive inspection sensor in response to ambient events associated with the structure. The method also includes characterizing a defect within the structure based on the data acquired by the non-destructive inspection sensor in response to the ambient events.

Aspects of the method include positioning the non-destructive inspection sensor within, or adjacent to, the structure, such as by embedding the non-destructive inspection sensor within the structure, an appliqué, or a repair patch. The method may further include storing the acquired data with at least one non-destructive inspection sensor. The method may also include providing the data acquired by at least one non-destructive inspection sensor to at least one wireless communication device carried by the structure and may wirelessly transmit the data from the wireless communication device. Moreover, the method may include generating one or more events within the structure with a respective signal generation device, as well as acquiring data indicative of the structure in response to the event(s) generated by the signal generation device(s). Additionally, the method could include characterizing a defect within the structure with a neural network, continuously or periodically acquiring data indicative of the structure.

According to an additional embodiment of the present invention a method for assessing and monitoring a structure is provided. The method includes acquiring data indicative of the structure with at least one non-destructive inspection sensor in response to ambient events associated with the structure, and preliminarily identifying a defect within the structure based on the data acquired by the non-destructive inspection sensor in response to the ambient events. In addition, the method further includes intentionally generating a stimulus within the structure after preliminarily identifying the defect, and further analyzing the preliminarily identified defect based on additional data acquired by the non-destructive inspection sensor in response to the intentionally generated stimulus. The method could also include determining a proximate location in which to intentionally generate the stimulus based on the preliminarily identified defect.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
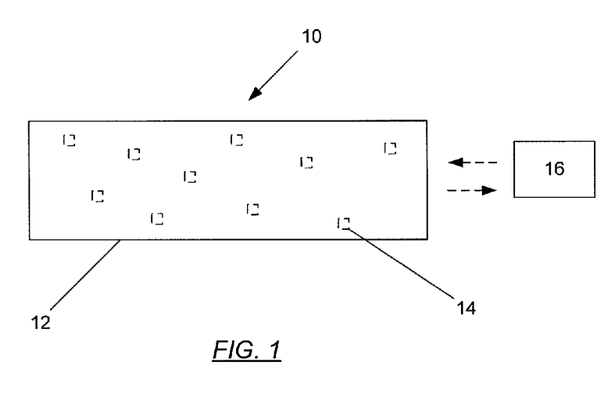
FIG. 1 is a plan view of an inspection system for monitoring and assessing a structure according to one embodiment of the present invention.

Referring now to the drawings and, in particular to FIG. 1, there is shown an inspection system 10 for monitoring and assessing a structure. The inspection system 10 includes a plurality of sensors 14 positioned on a structure 12. The sensors 14 are capable of acquiring data indicative of the structure 12 in response to ambient events associated with the structure and communicating with a data acquisition system 16. The data acquisition system 16 is capable of generating information indicative of a defect in the structure 12 based on the data acquired by the sensors 14. Thus, the structure 12 is capable of being at least periodically, continuously, or otherwise repeatedly, monitored so that the structural integrity of the structure may be assessed by identifying any defects in the structure.

The inspection system 10 could be used to inspect any number of structures 12 in a variety of industries where detection of flaws or defects in the structure is required, such as in the aircraft, automotive, marine, or construction industries. The sensors 14 are capable of detecting any number of flaws or defects within or along the surface of the structure, such as impact damage (e.g., delaminations and matrix cracking), disbonds (e.g., airframe/reinforcing members or honeycomb composites), discontinuities, voids, or porosity, which could adversely affect the performance of the structure. In addition, the sensors 14 could be utilized for various other purposes, such as for storing various types of information, such as data acquired by the sensors or provided by the data acquisition system 16, as will be explained in further detail below. Furthermore, the inspection system 10 can be used with additional inspection systems. For example, the inspection system 10 could be used to monitor and assess only those locations on the structure 12 that are not readily accessible, while other conventional inspection techniques could be used to inspect other locations on the structure.

The sensors 14 are capable of acquiring data indicative of the structure 12 in response to ambient events associated with the structure and/or any number of signal generation devices employed to generate an event within the structure. In this regard, ambient events are those events that induce a stimulus (e.g., vibration or resonance) within the structure as a result of normal operation or use of the structure 12 that is capable of being detected by the sensors 14. As a result, ambient events are not events that are created for the sole purpose of inducing a stimulus for detection by the sensors in order to aid in understanding the analysis of the structure. Conversely, a signal generation device could be any device capable of intentionally inducing a stimulus within the structure 12. According to one embodiment, the ambient events or signal generation devices would generate ultrasonic stress waves within and along the structure 12 and, in particular Lamb waves, although Raleigh, standing resonance, or other types of ultrasonic waves could be generated. According to one embodiment of the present invention, the structure is an aircraft, and the ambient events could include take-off or landing, APU and main engine vibrations, closing cargo doors, cargo loading, walking on the passenger floor, etc. Additionally, the signal generation device could be, for example, a mechanical tapper, a mechanical impedance device, or a piezo-electric transducer. The signal generation devices could be independent of the structure 12, or attached or otherwise carried by the structure. According to one embodiment, the signal generation devices could be attached to the wing box, landing gear, nacelles, stringers, or on the main wing/empennage wing spars. Thus, any number of ambient events and/or signal generation devices are capable of inducing a stimulus within the structure 12 that is capable of being detected by the sensors 14.

The term "structure" is also not meant to be limiting, as the inspection system 10 could be used to inspect any number of parts or structures of different shapes and sizes, such as machined forgings, castings, pipes, or composite panels or parts. The inspection could be performed on newly manufactured structures or existing structures that are being inspected for preventative maintenance purposes. Further, the structure could be any number of materials. For example, the structure could be a metallic material, such as aluminum, or a composite material, such as graphite-epoxy. Moreover, the structure could be an aircraft, such as the Boeing 787, where a substantial portion of the aircraft structure is a composite material (e.g., the fuselage and wings).

Each of the sensors 14 could be any suitable sensor or transducer capable of transmitting and receiving signals, as well as communicating with the data acquisition system 16. Each sensor 14 is typically a non-destructive sensor, such that the sensor is capable of inspecting a structure without harming the structure or requiring disassembly of the structure. In the embodiment of the inspection system 10 shown in FIG. 1, each sensor 14 is an ultrasonic sensor, such as a piezo-electric sensor. However, various other sensors may be employed with the inspection system 10 of the present invention, such as pitch-catch, through-transmission, shear-wave, resonance, or mechanical impedance sensors. For instance, pitch-catch sensors could be arranged on the structure 12 such that one sensor could transmit an ultrasonic signal into the structure and be picked up by a receiving sensor. Furthermore, the sensor 14 may be any number of sizes and configurations depending on a variety of factors, such as the size, configuration, or type of material of the structure 12, the type of sensor, and/or the type of defect(s) desired to be detected. A plurality of sensors 14 could alternatively be arranged in an array or grid, such as that shown in FIG. 3. Thus, as described above, the sensors 14 could be interrogated using ambient events and/or signal generation devices in order to generate an event within the structure.

The sensors 14 are typically utilized to collect data indicative of the structure 12 that may be used by the data acquisition system 16 to characterize a defect in the structure. However, the sensors 14 may also be employed to acquire data for sensing various conditions on the structure. For example, strain gages could be used to determine if composite repairs are required; capacitive or eddy current thickness sensors could be placed in remote regions on the structure 12 where corrosion thinning is present; and remote crack growth could be monitored by a series type strain, eddy current, or crack wire sensor that monitors crack progression.

Each of the sensors 14 is capable of communicating with the data acquisition system 16 wirelessly and through direct wired connections. Thus, the sensors 14 could be any device capable of acquiring data indicative of the structure and transferring the data to a data acquisition system 16 via wireless communications. For example, each sensor 14 is capable of utilizing wireless technology, such as radio frequency emissions (e.g., via RFID, broadband, WiFi, Bluetooth®g, etc. communication) or other wireless techniques (e.g., via infrared communication) to communicate with the data acquisition system 16. For an exemplary wireless device capable of acquiring non-destructive inspection data and communicating wirelessly with a data acquisition system see, U.S. patent application Ser. No. 11/266,459, entitled "Structural Assessment and Monitoring System and Associated Method," which is assigned to the present assignee and incorporated herein by reference.

Moreover, in an additional embodiment of the present invention, current paths or signal lines to and from each sensor 14 are incorporated (e.g., through some form of metallic deposition, etching, or bonding) or attached (e.g., via wires) to the structure 12. Each of the sensors 14 may be attached to the current paths of this conductive network so that the sensors may communicate with the data acquisition system 16. The network serves to aggregate signals from sensors 14 such that a single cable connects the network to the data acquisition system 16 in one wireline embodiment. Yet, separate communication wires or cables may extend between each respective sensor 14 and the data acquisition system 16 such that the network is not required. However, a conductive network may be advantageous in some embodiments since the multiple wires or cables required to extend between a plurality of sensors 14 and the data acquisition system 16 may become difficult to manage or maneuver.

Figure 2:
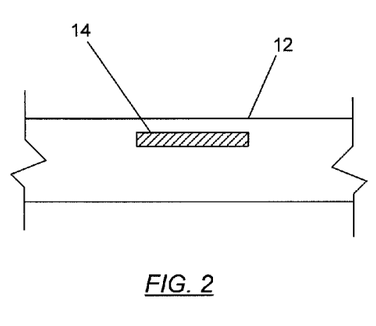
FIG. 2 is a cross-sectional view of a structure and a sensor embedded therein according to one embodiment of the present invention.

The sensors 14 are typically positioned proximate or adjacent to the structure 12. For example, the sensors 14 may be embedded within the structure 12, as shown in FIG. 2, attached to an internal or external surface of the structure, or positioned proximate or adjacent to the structure using other techniques. For instance, the sensors 14 may be attached directly to the structure 12 with various fastening techniques, such as adhesives. In addition, the sensors 14 could be carried by a repair patch or an appliqué such that the sensors acquire data indicative of a specific portion of the structure 12. For example, see U.S. patent application Ser. No. 11/266,499, entitled "Smart Repair Patch and Associated Method," respectively, which is assigned to the present assignee and incorporated herein by reference, and which provides further details regarding repair patches incorporating non-destructive inspection sensors. Further, the sensors 14 could be carried by inspection devices, such as an inspection system for impact-echo testing which is disclosed in further detail in U.S. patent application Ser. No. 11/168,021, entitled "Non-Destructive Inspection System and Associated Method," which is assigned to the present assignee and incorporated herein by reference.

In one embodiment of the present invention, the sensors 14 can be placed on specific locations on the structure 12 that are expected to encounter a future event. An event near the sensors 12 will be detected by the sensors and translated to an electrical current, which is then stored as a digital value and/or communicated to the data acquisition system 16. In addition, the time that the event occurred may be stored by the sensors 14 and/or the data acquisition system 16. In this regard, the sensors 14 are passive such that the sensors acquire data when ambient events associated with the structure 12 occur and/or when signal generation devices are utilized. An inspector can check for event levels near the sensors 14. Typically, defects or flaws would be indicated when the data of one or more sensors 14 varies from standard or baseline information (e.g., data acquired at a previous maintenance check using the same technique to generate the event within the structure), with the variation typically being more than a predefined percentage or more than a predefined amount (in absolute terms).

Figure 3:
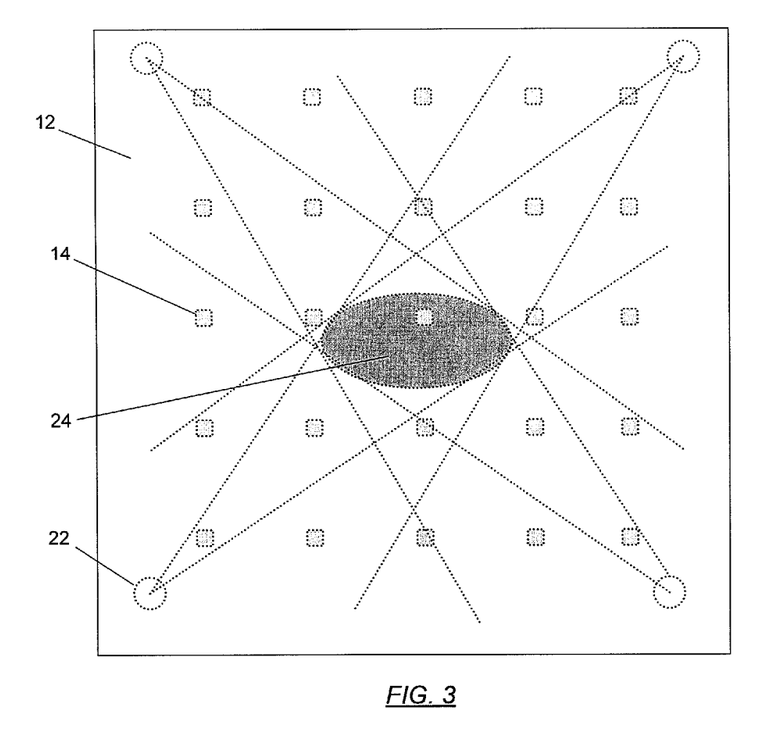
FIG. 3 is a plan view of a configuration of an array of sensors on a structure according to a particular embodiment of the present invention.

As shown in FIG. 3, the inspection system 10 according to one embodiment of the present invention includes an array of sensors 14. In the illustrated embodiment, signal generation devices 22 are employed to generate respective events at various locations on the structure 12. The events could be generated continuously in real time or periodically, such as monthly during a periodic inspection. As the stimulus (e.g., ultrasonic stress wave) associated with each event travels along the structure 12, the presence of a flaw 24 can be determined by converting the stimulus into a signal with one or more sensors 14 proximate to the defect. Thus, if the events are uniformly generated at locations corresponding to respective signal generation devices 22, changes in data acquired by individual sensors 14 will be indicative of any flaws within the structure 12. In addition, in areas where there is symmetry or physical correspondence associated with particular portions of the structure 12 (e.g., along spars or in the middle of an aircraft skin panel), the data acquired by neighboring sensors 14 will provide information regarding the presence and/or location of a flaw. In other words, the sensors 14 would be expected to experience a similar signal to their neighboring sensors. Measurable changes that are different from those of their neighboring sensors would indicate damage is present.

The sensors 14 also acquire data indicative of the structure 12 in response to various ambient events. By providing a database or history of baseline data for each sensor 14 in response to each type of ambient event, an indication of potential flaws is determined when the response of one or more sensors changes or the relationship between neighboring sensors changes. As such, comparison of the acquired data and any baseline data associated with each sensor 14 will aid in determining trends or changes that represent that a flaw is present.

According to one embodiment of the present invention, ambient events and signal generation devices are used in conjunction with one another. In particular, the data acquisition system 16 could monitor the signals received by the sensors 14 in response to various ambient events. Advantageously, this monitoring could occur frequently, if not continuously, and could be done either in real time or without much delay. One or more signal generation devices could be attached or otherwise carried by the structure 12, or the signal generation devices could be independent of the structure and operated by a technician.

Figure 6:
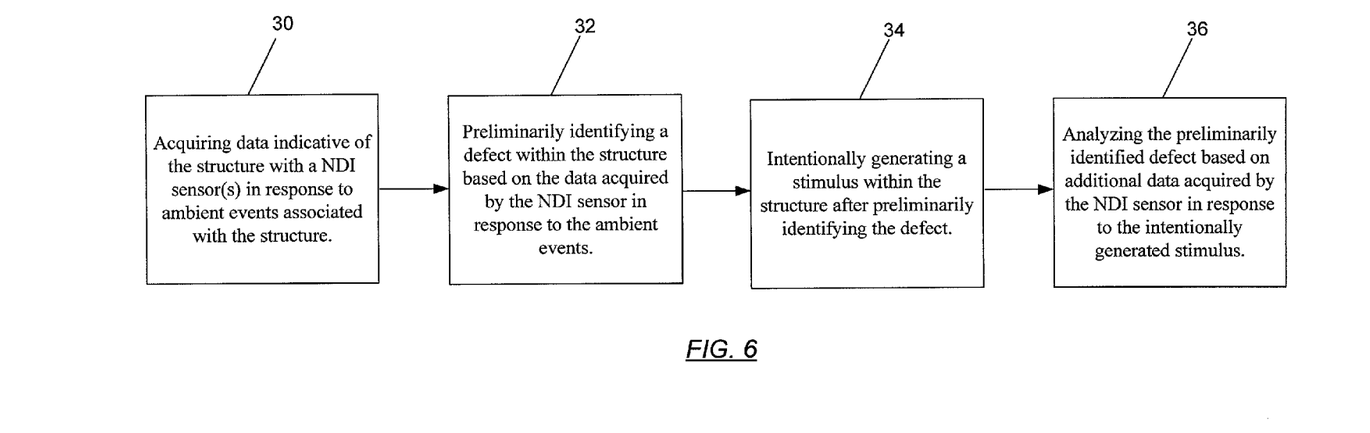
FIG. 6 is a flowchart of a method for monitoring and assessing a structure according to an additional embodiment of the present invention.

In instances in which the signals provided by the sensors 14 in response to ambient events were indicative of a flaw, such as a result of its variance from a baseline value, additional non-destructive inspection may be employed to confirm the presence of a flaw and/or to more precisely locate and quantify the flaw (see blocks 30 and 32 of FIG. 6). For example, there may be instances where verification or additional data is required to determine if a flaw is present within the structure 12. As such, a signal generation device could be utilized to verify and/or further analyze the presence of a potential flaw in the structure 12 that was detected by the sensors 14 as a result of one or more ambient events (see blocks 34 and 36 of FIG. 6). For instance, the location of the flaw that was preliminarily identified based on ambient events could be determined using a signal generation device. In any event, the detection of a flaw by the sensors 14 in response to ambient events helps to promptly detect the flaw so that it can be repaired prior to propagation of the flaw and helps to pinpoint where upon the structure 12 additional testing with the signal generation devices should be conducted.

Moreover, embodiments of the present invention provide a system 10 capable of global interrogation. More specifically, rather than gathering and comparing data acquired by each sensor 14 periodically (e.g., monthly), the data could be accumulated for each of the sensors over time. Thus, each sensor 14 acts as a counter of data collected over a predetermined period of time in response to various ambient events. For example, the data acquired for a predetermined period of time could be mapped to show various trends, and comparison of data between sensors 14 could be made, as local defects or flaws can isolate individual sensors or alter the signals detected by sensors that are proximate to one another.

Embodiments of the present invention also contemplate that various events may need to be differentiated from one another for further analysis. For example, neural networks may be utilized in order to differentiate and interpret various events based on data acquired by the sensors 14. Neural networks, as known to those of ordinary skill in the art, are a form of a multiprocessor computer system using "biological" computing. Neural networks are capable of processing continuously variable input values using computed decisions based on weighted sums and thresholds. By adjusting the weighted sums, the neural network is capable of "training" or "learning" based on the traditional iterative nature of biological learning processes. In addition, neural networks utilize highly interconnected processing elements (i.e., neurons) working in parallel with one another to solve a specific problem. In particular, neural networks may be trained to extract patterns and detect trends that would ordinarily be too complex to be noticed by humans or other conventional computing techniques. For instance, according to one embodiment of the present invention, neural networks could be employed to recognize the existence of a flaw, locate flaws, identify the type of flaw, or differentiate different types of flaws in response to ambient events. The neural network will be able to learn to differentiate different types of ambient events, such as to determine if a signal detected by the sensor has varied so as to be indicative of a flaw. Moreover, neural networks may be used in conjunction with conventional computing techniques to complement one another depending on the problem to be solved.

Figure 5:
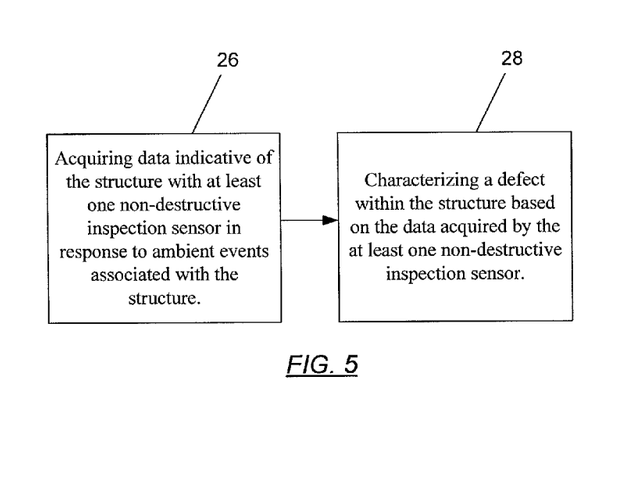
FIG. 5 is a flowchart of a method for monitoring and assessing a structure according to one embodiment of the present invention.

The data acquisition system 16 typically includes a processor or similar computing device operating under the control of software so that data acquired by the sensors 14 may be analyzed to characterize any defects in the structure (see FIG. 5, blocks 26 and 28). The processor could be embodied by a computer such as a desktop computer, laptop computer, tablet computer, or portable processing device capable of processing the data generated by the sensors 14. For example, the data acquisition system 16 could include a device, such as a hand-held reader/writer, that a technician could use to scan the structure 12 proximate to the sensors 14 and download data acquired by the sensors during on-the-ground inspection. In addition, the device (e.g., a hand-held reader/writer) could be employed intermediately to collect or log the data from the sensor 14 such that the data acquisition system 16 could then download the data from the device for further processing. Similarly, the data acquisition system 16 could directly communicate with the sensors 14 to receive data acquired by the sensors 14 in real time or periodically. The data acquisition system 16 may also create a database to store the data acquired by the sensors 14 in response to the data collected by the data acquisition system.

Typically, the data acquisition system 16 acquires data from the sensors 14 in real time or periodically. However, the data acquisition system 16 is also capable of interrogating each sensor 14, such as for confirming the presence of a flaw and/or the location of a flaw, as described above. For instance, the data acquisition system 16 may include a pulser/receiver card, or similar device, that is utilized to interrogate the sensors 14 such that the sensors are capable of transmitting signals within and receiving signals from the structure 12, such as ultrasonic stress waves. Thus, the data acquisition system 16 could also be employed to verify the data acquired by the sensors 14 as a result of various ambient events. In one embodiment of the present invention, sensors 14, such as piezo-electric sensors, can act as passive ultrasonic receivers, where a received stress pulse is translated into an electric pulse. In the passive mode, the sensors 14 could collect stress wave data and, in turn, emit an electric pulse that travels to the data acquisition system 16.

Figure 4:
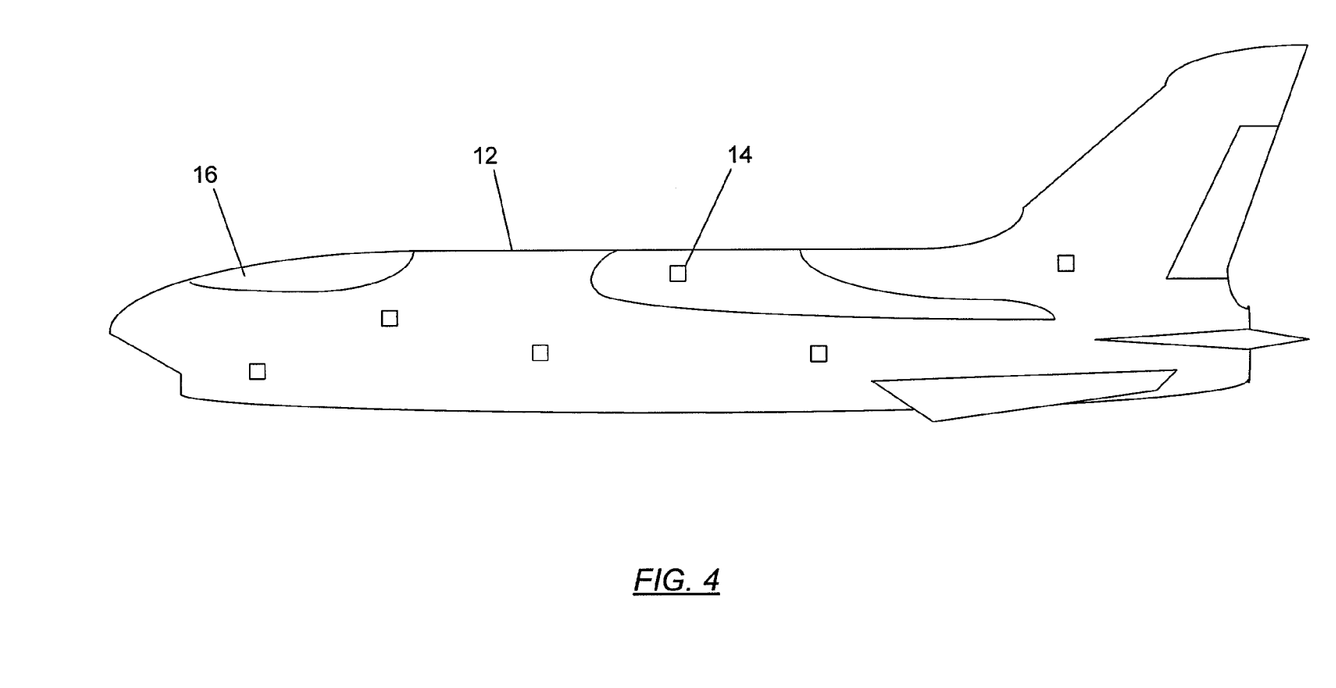
FIG. 4 is an elevational view of an inspection system for monitoring and assessing an aircraft according to another embodiment of the present invention.

The data acquisition system 16 is configured to process the data accumulated by each sensor 14. In further embodiments of the present invention the data acquisition system 16 may be used to process data while the structure 12, such as an aircraft, is in use (e.g., in flight). Thus, a data acquisition system 16 could be employed for on-aircraft monitoring of specific locations on the aircraft that are susceptible to the formation of defects, such as that shown in FIG. 4. The data acquisition system 16 could also interrogate or acquire data from the sensor 14 individually, in specific patterns, or simultaneously. Furthermore, each sensor 14 could include an identifier such that the acquired data may be associated with a specific sensor.

The sensors 14 of one embodiment are capable of storing data indicative of the structure 12. In particular, the sensors 14 may store the data as it is acquired (e.g., periodically or continuously). Moreover, the sensors 14 may not only store acquired data, but also additional data, such as information relating to the operating environment (e.g., temperature), maintenance (e.g., maintenance schedule or procedures), and/or specific characteristics of the structure 12 (e.g., specifications). The sensors 14 could be reset, i.e., the data erased, after the data is communicated to the data acquisition system 16, periodically, or at any other desired time. It is also understood that each sensor 14 could include a processor for processing the acquired data and generating information indicative of a defect in the structure 12. In this regard, the sensor 14 could then transfer the data to a data acquisition system 16 or other device to be displayed or analyzed to determine if remedial action is required. However, the data acquisition system 16 will typically perform some or all of the processes associated with analyzing the data acquired by the sensors 14.

The data acquisition system 16 generates information indicative of the structure 12, including, for example, at least those defects detected within the structure, based on data acquired by the sensors 14 and may display an image, such as an A-scan, a B-scan, or a C-scan. The data acquisition system 16 is capable of generating information indicative of a defect and may also allow a user to store and edit previously created images. Therefore, a permanent record of the images may be kept for future use or record keeping. However, it is understood that in addition to displaying images with a display, the data acquisition system 16 could mathematically collect and analyze data from the sensors 14 that a technician could use to characterize a defect based on the data. Based on the characterization of the defect, a technician may make a decision whether to repair, replace, or take other action to address the defect. Software for analyzing the data acquired by the sensors 14, as known to those of ordinary skill in the art, is typically used to generate information characterizing defects in the structure 12. Thus, the data acquired by the sensors 14 is generally in a format that may be employed with software for analyzing the data, as well as in a format capable of being processed by the data acquisition system 16.

Embodiments of the present invention may provide several advantages. For example, the sensors 14 can by integrated or attached to the structure 12 at a variety of locations such that the sensors are adaptable for inspecting any number of structures and in areas otherwise difficult to access. In addition, the sensors 14 may be low cost and relatively incomplex, such that the structure 12 may be easily and efficiently monitored for improved structural health assessment. The inspection system 10 may also utilize ambient events to passively interrogate the sensors 14 periodically or continuously in order to inspect the structure 14 for flaws. Thus, the sensors 14 are also capable of acquiring and storing data indicative of the structure 12 while the structure, such as an aircraft, is in use. Furthermore, the data acquisition system 16 may process the data acquired by the sensors 14 and provide information regarding a variety of defects, such as the type and location of the defect in the structure 12 based on the data passively acquired by the sensors.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for assessing and monitoring a structure comprising:
   at least one signal generation device for generating at least one event within the structure;
   at least one non-destructive inspection sensor carried by the structure and configured for acquiring data in response to ambient events associated with the structure and at least one event generated by the signal generation device; and
   a data acquisition system configured to communicate with the non-destructive inspection sensor and to provide information indicative of a defect in the structure based on the data acquired by the non-destructive inspection sensor in response to the ambient and generated events.

2. The system according to claim 1, wherein the non-destructive inspection sensor is integrated with a radio frequency identification tag.

3. The system according to claim 1, wherein the non-destructive inspection sensor comprises a piezoelectric sensor.

4. The system according to claim 1, wherein the non-destructive inspection sensor is attached to, or embedded within, the structure.

5. The system according to claim 1, wherein the non-destructive inspection sensor is carried by an appliqué or a repair patch.

6. The system according to claim 1, wherein the non-destructive inspection sensor comprises a memory device for storing the acquired data.

7. The system according to claim 1, wherein the signal generation device is attached to, or embedded within, the structure.

8. The system according to claim 1, wherein the data acquisition system comprises a neural network for analyzing the acquired data.

9. A method for assessing and monitoring a structure comprising:
intentionally generating at least one event within the structure;
acquiring data indicative of the structure with at least one non-destructive inspection sensor in response to ambient events associated with the structure and at least one intentionally generated event; and
characterizing a defect within the structure based on the data acquired by the at least one non-destructive inspection sensor in response to the ambient and intentionally generated events.

10. The method according to claim 9, further comprising positioning the at least one non-destructive inspection sensor within or adjacent to the structure.

11. The method according to claim 10, wherein positioning comprises embedding the at least one non-destructive inspection sensor within the structure.

12. The method according to claim 11, wherein positioning comprises positioning the at least one non-destructive inspection sensor within an appliqué or a repair patch.

13. The method according to claim 9, further comprising storing the acquired data with the at least one non-destructive inspection sensor.

14. The method according to claim 9, further comprising wirelessly transmitting the data from the at least one non-destructive inspection sensor.

15. The method according to claim 9, wherein characterizing comprises characterizing a defect within the structure with a neural network.

16. The method according to claim 9, wherein acquiring comprises continuously or periodically acquiring data indicative of the structure.

17. A method for assessing and monitoring a structure comprising:
acquiring data indicative of the structure with at least one non-destructive inspection sensor in response to ambient events associated with the structure;
preliminarily identifying a defect within the structure based on the data acquired by the at least one non-destructive inspection sensor in response to the ambient events;
intentionally generating a stimulus within the structure after preliminarily identifying the defect; and
further analyzing the preliminarily identified defect based on additional data acquired by the at least one non-destructive inspection sensor in response to the intentionally generated stimulus.

18. The method of claim 17, further comprising determining a proximate location in which to intentionally generate the stimulus based on the preliminarily identified defect.

19. The system according to claim 1, wherein the signal generation device is configured to generate stress waves within the structure.

20. The method of claim 9, wherein intentionally generating comprises generating stress waves within the structure.

21. The method of claim 17, wherein intentionally generating comprises generating stress waves within the structure.

22. The system according to claim 1, wherein the data acquisition system is further configured to generate an image indicative of the defect, wherein the image is selected from a group consisting of an A-scan, a B-scan, and a C-scan.

23. The method of claim 9, wherein characterizing the defect comprises generating an image selected from a group consisting of an A-scan, a B-scan, and a C-scan.

24. The method of claim 17, wherein further analyzing comprises generating an image selected from a group consisting of an A-scan, a B-scan, and a C-scan.

* * * * *